(12) United States Patent
Wang et al.

(10) Patent No.: US 11,403,261 B2
(45) Date of Patent: Aug. 2, 2022

(54) ISOLATION OF CONCURRENT READ AND WRITE TRANSACTIONS ON THE SAME FILE

(71) Applicant: VMware, Inc., Palo Alto, CA (US)

(72) Inventors: Wenguang Wang, Santa Clara, CA (US); Richard P. Spillane, Palo Alto, CA (US); Junlong Gao, Mountain View, CA (US); Fengshuang Li, Champaign, IL (US)

(73) Assignee: VMware, Inc., Palo Alto, CA (US)

( * ) Notice: Subject to any disclaimer, the term of this patent is extended or adjusted under 35 U.S.C. 154(b) by 139 days.

(21) Appl. No.: 16/213,561

(22) Filed: Dec. 7, 2018

(65) Prior Publication Data

US 2020/0183890 A1 Jun. 11, 2020

(51) Int. Cl.
*G06F 16/176* (2019.01)
*G06F 16/18* (2019.01)

(52) U.S. Cl.
CPC ...... *G06F 16/1774* (2019.01); *G06F 16/1865* (2019.01)

(58) Field of Classification Search
CPC .......................... G06F 16/1774; G06F 16/1865
See application file for complete search history.

(56) References Cited

U.S. PATENT DOCUMENTS

| 6,023,706 | A * | 2/2000 | Schmuck | G06F 16/1858 |
| 9,280,578 | B1 * | 3/2016 | Zhou | G06F 16/1865 |
| 2012/0296872 | A1 * | 11/2012 | Frost | G06F 16/27 707/634 |
| 2014/0047360 | A1 * | 2/2014 | Kay | G06F 9/451 715/760 |
| 2020/0142974 | A1 * | 5/2020 | Porat-Stoler | G06F 16/1752 |

* cited by examiner

*Primary Examiner* — Anhtai V Tran
*Assistant Examiner* — Xiaoqin Hu

(57) ABSTRACT

The disclosure provides for isolation of concurrent read and write transactions on the same file, thereby enabling higher file system throughput relative to serial-only transactions. Race conditions and lock contentions in multi-writer scenarios are avoided in file stat (metadata) updates by the use of an aggregator to merge updates of committed transactions to maintain file stat truth, and an upgrade lock that enforces atomicity of file stat access, even while still permitting multiple processes to concurrently read from and/or write to the file data. The disclosure is applicable to generic file systems, whether native or virtualized, and may be used, for example, to speed access to database files that require prolonged input/output (I/O) transaction time periods.

20 Claims, 7 Drawing Sheets

FIG. 6

| MERGEABLE UPDATE RULES | 600 |

FOR FILE SIZE AND TIMESTAMPS, SELECT MAXIMUM  602
Example:
Initial file size = 100
Writer A: writes; changes file size 100 to 110; file size delta = +10
Writer B: writes; changes file size 100 to 120; file size delta = +20
Final file size = max (110, 120) = 120

FOR NUMBER OF BLOCKS, SUM ALL DELTAS AND ADD TO INITIAL  604
Example:
Initial numblocks = 50
Writer A: writes 10 blocks; numblocks delta = +10 (abs = 60)
Writer B and Writer C concurrent
Writer B: writes 20 blocks; numblocks delta = +10 (abs = 60+10 = 70)
Writer C: write 1 block; numblocks delta = +1 (abs = 61)
Final numblocks = 50 + 10 + 10 + 1 = 71

FOR UPGRADE LOCKS (ATOMIC)  606

IF NO PRIOR UPGRADE LOCK, NEW UPGRADE LOCK OK  608
An upgrade lock can exist with multiple shared locks IF PRIOR-EXISTING UPGRADE LOCK, NO NEW UPGRADE LOCK  610
An upgrade lock cannot exist with another upgrade lock IF PRIOR-EXISTING EXCLUSIVE LOCK, NO NEW UPGRADE LOCK  612
An upgrade lock cannot exist with an exclusive lock

ISOLATION OF CONCURRENT READ AND WRITE TRANSACTIONS ON THE SAME FILE

BACKGROUND

Some file systems use transactions to provide atomicity, consistency, isolation, and durability (ACID) properties for file operations, and in some use cases, concurrent read/write transactions on the same file may be frequent. Previously, concurrency has been achieved by using a byte-level range lock, which allows read/write operations that do not have overlapping ranges to be executed concurrently. However, access to the file data may result in changes to the file's metadata. For example, multiple processes reading disjointed sections of the file data could result in concurrent attempts to update the metadata, specifically access time (atime).

Unfortunately, metadata changes cannot be isolated using a range lock, resulting in a race condition. Additionally, updating metadata prior to a transaction commit introduces potential inaccuracy for other processes. If a first process changes the file metadata, for example change time (ctime) and file size, prior to committing a write transaction, a second process reads the changed metadata, and then the first process fails prior to the transaction commit, then the second process will be operating on corrupted (e.g., untruthful) data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An exemplary system for isolating concurrent read and write transactions on a file comprises: a processor; a computer-readable medium storing instructions that are operative when executed by the processor to: obtain an upgrade lock of file stat data for the file; copy at least a portion of the file stat into a private storage; for each mergeable transaction in a transaction group, merge an update of the current mergeable transaction into the file stat portion in the private storage; atomically store the file stat portion of the private storage into the file stat data for the file; and release the upgrade lock of the file stat data for the file.

BRIEF DESCRIPTION OF THE DRAWINGS

The present description will be better understood from the following detailed description read in the light of the accompanying drawings, wherein:

FIG. 6 illustrates an example mergeable update rule set for updating the shared metadata of FIG. 2;

DETAILED DESCRIPTION

Figure 1:
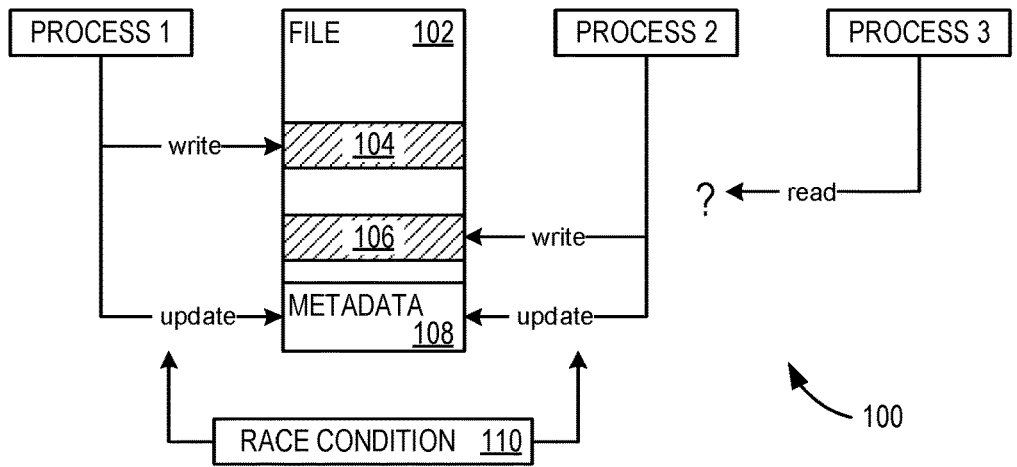
FIG. 1 illustrates a race condition problem in a multi-writer scenario.

FIG. 1 illustrates a race condition problem in a multi-writer scenario 100. A file 102 is being written to concurrently by two separate processes: process 1 and process 2. Process 1 writes to a first portion 104 of file 102, and process 2 writes to a second portion 106 of file 102. Both process 1 and process 2 increase the size of file 102 and add new blocks. During this time, but prior to completion by either process 1 or process 2, a third process, process 3, is attempting to read from file 102. Upon process 1 and process 2 completing their respective writing operations, process 1 and process 2 each attempts to access metadata 108 to update data such as a timestamp, the file size, and the number of blocks. Metadata 108 is a single shared object, and therefore, a race condition 110 exists, in which one of process 1 and process 2 will write its update first, followed by the other. A problem with this scheme is that each of process 1 and process 2 bases its own update on the prior version of metadata 108, with the second one over-writing (rather than incorporating) the other's update. Thus, the final version of metadata 108 reflects only the updates from one of process 1 or process 2, rather than both.

To overcome such a problem associated with multi-writer scenario 100 of FIG. 1 and other problems, various aspects of the systems and methods described herein provide for isolation of concurrent read and write transactions on the same file, thereby enabling higher file system throughput relative to serial-only transactions. Race conditions and lock contentions in multi-writer scenarios are avoided in file stat (metadata) updates by the use of an aggregator to merge updates of committed transactions to maintain file stat truth, and an upgrade lock that enforces atomicity of file stat access, even while still permitting multiple processes to concurrently read from and/or write to the file data. The disclosure is applicable to generic file systems, whether native or virtualized, and may be used, for example, to speed access to database files that require prolonged input/output (I/O) transaction time periods. Thus, the current disclosure may be advantageously employed for large files, when I/O requires a long time period, and serialized transactions (with each employing exclusive access) would otherwise introduce significant delays.

In this manner, the disclosure is able to maintain truth of metadata, such as timestamps, file size, and the number of blocks that the file occupies while enabling quicker reads and writes. Some examples may be implemented on a virtual distributed file system (VDFS) in which file data is changed concurrently, while the metadata is updated atomically. In order to provide both isolation and concurrency, a Read-Copy-Update (RCU) stat data structure and shared pointer are used to store metadata updates, with the possibility of maintaining multiple version of the metadata for a single file. A read transaction reads from the latest version of metadata when it begins, and that metadata version (accessed by the read transaction) does not change, even if a newer version of the metadata is created.

Each transaction holds its own metadata update privately prior to the transaction commit. Upon the commit, the transaction appends a new, public version of the metadata. Atomic pointer load and store operations are used to avoid race conditions, and obsolete metadata is deleted after the final read transaction commits. Isolation of the updates is ensured because uncommitted metadata changes are private. Concurrency of read and write operations is unaffected, because there is no blocking operation in the RCU process. A group commit operation is used to aggregate metadata changes from multiple transactions, thereby merging updates to timestamps, file size, and the number of blocks.

It should be understood that any of the examples herein are non-limiting. As such, the present disclosure is not limited to any particular embodiments, aspects, concepts, structures, functionalities or examples described herein. Rather, the present disclosure may be used in various ways that provide benefits and advantages in computing systems including virtualized computing environments.

Figure 2:
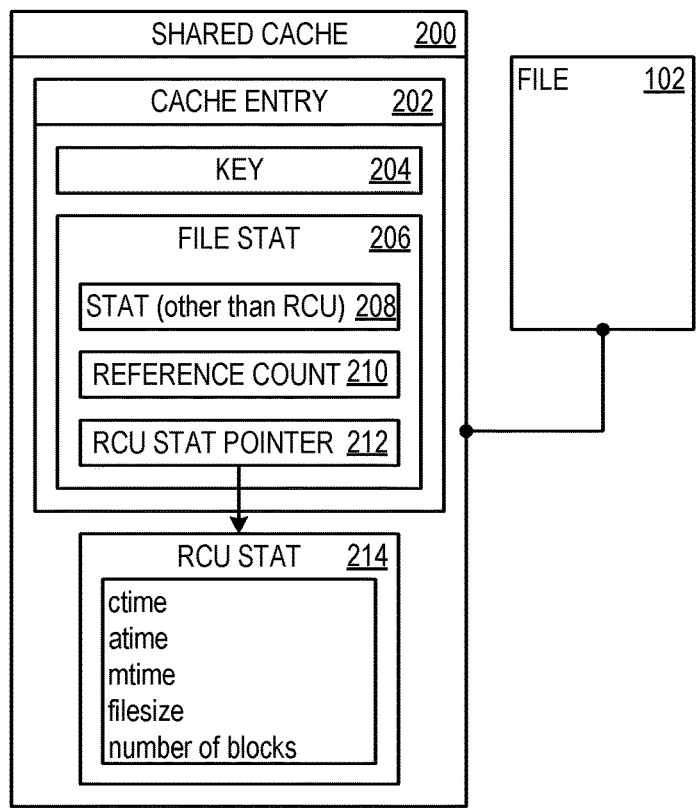
FIG. 2 illustrates an example of shared metadata.

FIG. 2 illustrates an example of shared metadata in a shared cache 200. Shared cache 200 has a cache entry 202 that includes a key 204 and a file stat 206. Key 204 may be an inode number or another unique file identifier. File stat 206 is metadata for a file, such as for example metadata 108 for file 102 (shown in FIG. 1). File stat 206 includes stat data 208 (which may be a pointer to the data or may be the actual data itself). Stat data 208 does not include data that is in RCU stat 214 (which is the type of data that may change with a read or write operation), but is instead additional metadata that does not change as a result of a read or write operation. Examples of stat data 208 include file attributes, such as a file name, owner, and permissions. An RCU stat pointer 212 is a shared pointer that indicates the memory location of RCU stat 214. Because RCU stat pointer 212 is shared, it does not create any race conditions.

The illustrated example of RCU stat 214 includes ctime, atime, mtime, file size, and number of blocks, which are mergeable data. Modification time (mtime) describes when the content of the file most recently changed. Some file systems do not compare data written to a file with the prior copy, so if a process overwrites part of a file with the same data as had previously existed in that location, mtime is updated even though the contents did not actually change. Access time (atime) identifies when the file was most recently opened for reading. Because some computer configurations are faster at reading data than at writing it, updating atimes after every read operation can become expensive. Therefore, some computer configurations mitigate this cost by storing atimes at a coarser granularity than mtimes and ctimes, so that a file which is read repeatedly in a short time frame only needs its atime updated once. Change time (ctime) in a UNIX brand operating system reflects time when certain file metadata, rather than file contents, were last changed, such as file permissions or file owner. For a WINDOWS brand operating system, ctime means creation time.

File stat 206 further includes a reference count 210 that counts the number of processes currently sharing RCU stat pointer 212. When a new process, either read or write, accesses the file (for which file stat 206 holds the metadata), the new process obtains shared RCU stat pointer 212 and reference count 210 increments. When that process releases shared RCU stat pointer 212, reference count 210 decrements. Additional detail is illustrated in FIG. 5.

Figure 3:
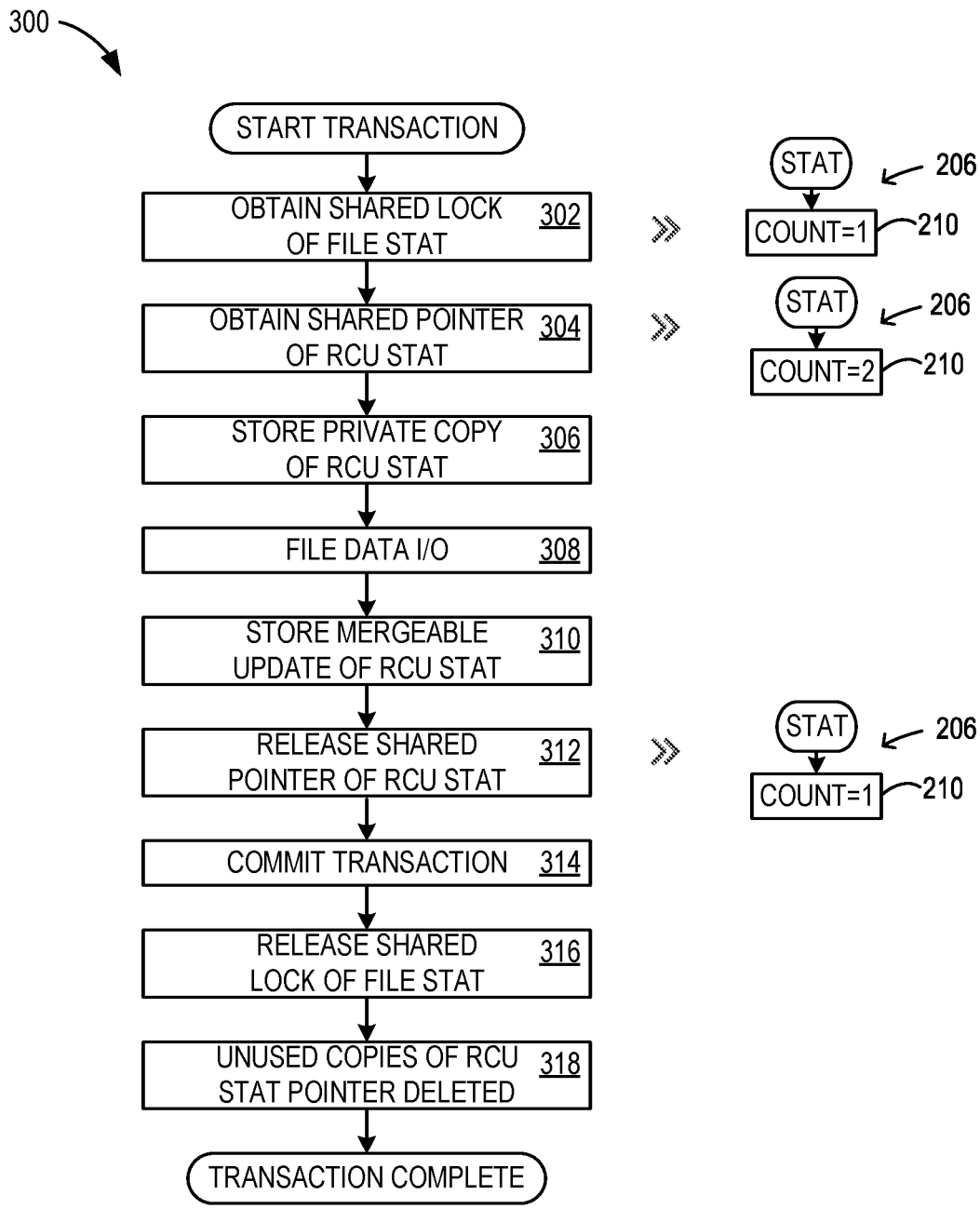
FIG. 3 illustrates a flowchart of example operations for isolating concurrent read and write transactions on a file, that may be used with the shared metadata of FIG. 2.

FIG. 3 illustrates a flowchart 300 of example operations for isolating concurrent read and write transactions on a file. The example operations illustrated by flowchart 300 are used with file stat 206 of FIG. 2 when reading from or writing to a file, and may be implemented while another process is writing to the same file in another transaction and yet another process is reading from the same file in yet another transaction. Operation 302 includes obtaining, by the writing process, a shared lock of the file stat data, for example, file stat 206 of FIG. 2. This prevents the file from being deleted. Operation 304 includes obtaining, by the writing process, a shared pointer, which points to at least a portion of the file stat, such as shared RCU stat pointer 212. For example, shared RCU stat pointer 212 points to a RCU stat 214, which is at least a portion of the data contained by file stat 206. The write process then stores a private copy of RCU stat 214 in operation 306, which is used for generating mergeable update information in operation 310.

Operation 308 includes file read and write operations (R/W operations or I/O operations), such as, for example, writing, by the writing process, to the file in a transaction. Operation 310 includes storing a mergeable update for the transaction, which reflects the necessary metadata update information to the private copy of RCU stat 214, which was saved during operation 306. The mergeable update is stored separately from other mergeable updates stored by other processes. This prevents the mergeable update information from one process from being overwritten by another process. Mergeable update information includes timestamps, file size, and number of blocks. Operation 312 includes releasing, by the writing process, the shared pointer of the at least a portion of the file stat (e.g., shared RCU stat pointer 212), and operation 314 includes committing the transaction. Operation 316 then includes releasing, by the writing process, the shared lock of the file stat. Any unused copies of the RCU stat pointer 212 (that pointed to obsolete copies of RCU stat 214) are deleted in operation 318, freeing up the memory that had been occupied by the obsolete copies of RCU stat 214. Additional detail on this operation is described in relation to FIG. 5B.

The status of the reference count for the shared pointer is also illustrated. In operation 302, when the writing process obtains a shared lock of the file stat, the reference count (e.g., reference count 210 of file stat 206) shows a value of 1, indicating that another process is already accessing the file. In operation 304, when the writing process obtains the shared pointer, the reference count increments to a value of 2. In operation 312, when the writing process releases the shared pointer, the reference count decrements to a value of 1. Additional detail on this operation is provided in the description of FIG. 5A. It should be understood that, although the operation 312 is described for a writing process, other examples of operation 312 involve a read processes. It should also be understood that multiple concurrent file operations, each operating according to flowchart 300, are possible.

Figure 4:
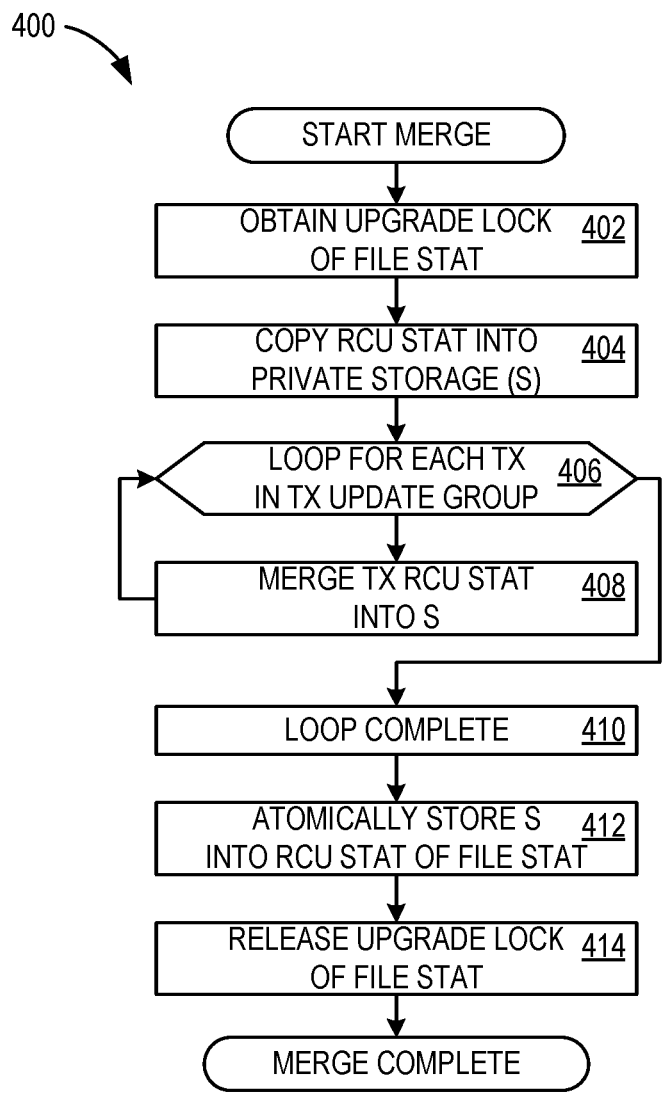
FIG. 4 illustrates a flowchart of other example operations for isolating concurrent read and write transactions on a file, that may be used with the shared metadata of FIG. 2.

FIG. 4 illustrates a flowchart 400 of example operations for isolating concurrent read and write transactions on a file. The example operations illustrated by flowchart 400 are used with file stat 206 of FIG. 2 when merging multiple concurrent metadata updates from multiple I/O processes, and is performed by an aggregator (such as, for example, aggregator 814 of FIG. 8). For example, each of multiple processes may have concurrently performed the operations of flowchart 300, and now the updates from those transactions are to be merged. The set of transaction updates to be merged together during the operations of flowchart 400 is a transaction group.

Operation 402 includes obtaining an upgrade lock of file stat data for the file (e.g. file stat 206 for file 102). The upgrade lock enforces atomic operations for the merging the updates, and avoiding race conditions. Operation 404 includes copying at least a portion of the file stat into a private storage. In some examples, copying at least a portion of the file stat into the private storage comprises copying RCU stat data including timestamp, file size, and a number of blocks for the file into the private storage. Looping operation 406 controls cycling through operation 408 for each mergeable transaction update in a transaction group, and exiting into operation 410 when complete. Operation 408 includes merging an update of the current mergeable transaction (the transaction which is being addressed by the current iteration of operation 40) into the file stat portion (e.g., RCU stat) in the private storage. In some examples, merging an update comprises selecting the maximum timestamp value for at least one timestamp selected from the list consisting of atime, ctime, and mtime. In some examples, merging an update comprises selecting a maximum file size value as a final file size value for the file. In some examples, merging an update comprises adding a delta of a number of blocks to an initial number of blocks to determine a final number of blocks. Additional detail on this operation is provided in the description of FIG. 6.

Operation 412 includes atomically storing the file stat portion of the private storage into the file stat data for the file. In some examples, this includes storing RCU stat pointer 212 for the merged RCU stat 214 into file stat 206. In some examples, atomically storing the file stat portion of the private storage into the file stat data for the file comprises creating a new pointer for the file stat portion, such as for example, creating a new RCU stat pointer 212. Additional detail on this operation is provided in the description of FIG. 5B. Atomicity of storing the file stat portion of the private storage into the file stat data for the file is provided by the upgrade lock. Operation 414 then releases the upgrade lock of the file stat data for the file (e.g., releases the upgrade lock of file stat 206).

Figure 5B:
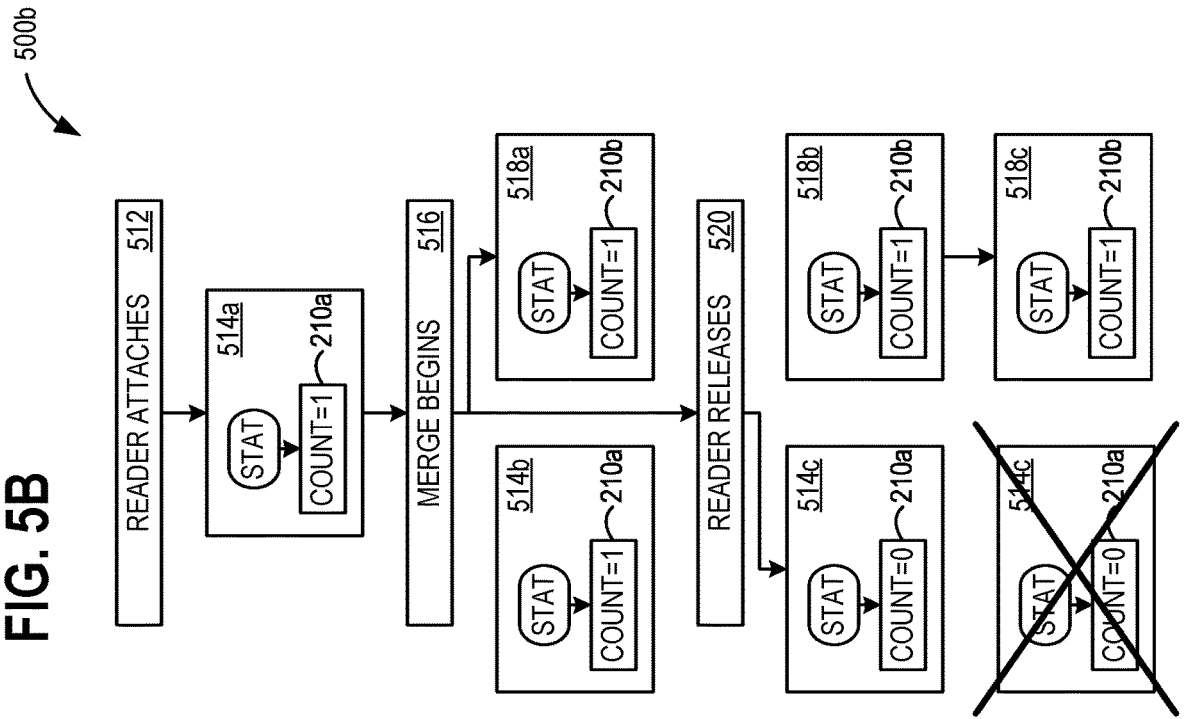
FIG. 5B illustrates an alternative example change scheme for a pointer count value when accessing the shared metadata of FIG. 2.
Figure 5A:
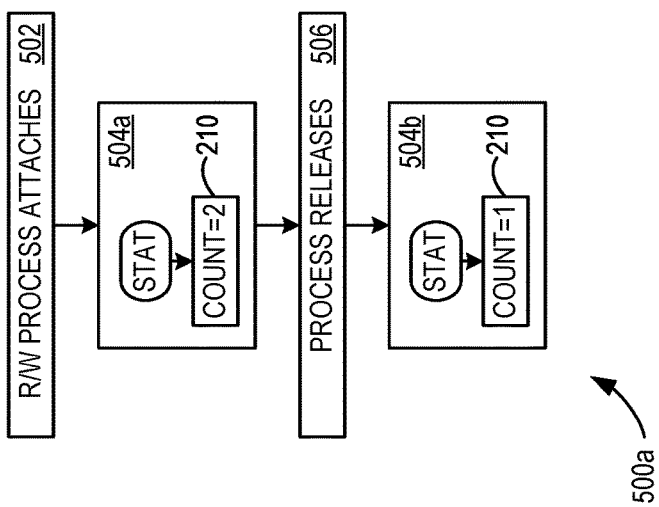
FIG. 5A illustrates an example change scheme for a pointer count value when accessing the shared metadata of FIG. 2.

FIG. 5A illustrates an example change scheme 500a for a pointer count value, such as reference count 210, when accessing file stat 206 of FIG. 2. At stage 502, a read/write process (R/W process) attaches to a file to perform an R/W operation, and reference count 210 (for RCU stat pointer 212) increments to 2, as indicated by status box 504a. At stage 506, the process releases the file, for example, by committing a transaction, and reference count 210 decrements back down to 1, as indicated by status box 504b. This describes the operations performed on reference count 210 during operations 304 and 312 of FIG. 3. In scheme 500a, the release of the file preserves the RCU stat pointer, because reference count 210 still has a value of 1.

FIG. 5B, however, illustrates an alternative example change scheme 500b in which a new RCU stat pointer 212 is created for a write process. Scheme 500b may also be used when accessing file stat 206 of FIG. 2. In operation 512 a reading process attaches to the file, for example operating according to flowchart 300. As indicated by status box 514a, reference count 210a has a value of 1. In operation 516, a merging operation, such as according to flowchart 400, begins. Rather than reference count 210a incrementing to a value of 2, reference count 210a remains at 1, and a new pointer is created, with a reference count 210b having a value of 1. The reference count 210b indicates that the merging operation is ongoing. This is shown in status box 514b (with status unchanged from status box 514a) and in a new status box 518a.

When the read process releases its RCU stat pointer, in operation 520, reference count 210a decrements to zero, as indicated in status box 514c. This results in the deletion of the first RCU pointer, according to operation 318 (of FIG. 3). Status box 518b (with status unchanged from status box 514a) indicates that the new RCU stat pointer is unperturbed. The new RCU stat pointer then becomes the RCU stat pointer for the file, and points to the merged updated RCU stat. Therefore any new processes accessing the file have access to the correct metadata, and the prior read process was not interrupted.

FIG. 6 illustrates an example mergeable update rule set 600 for updating file stat 206 of FIG. 2. Rule set 600 is used, for example, during operation 408 of flowchart 400. Rule set includes rules 602, 604, and 606, which further includes rules 608, 610, and 612. Rule 602 applies to timestamps and file size values. Rule 602 is to select the maximum value among various values of the mergeable updates and the initial RCU stat data. The illustrated example indicates that an initial file size was 100; writer A changes the file size from 100 to 110, which is a delta of +10; Writer B changes the file size from 100 to 120, which is a delta of +20. Rule 602 uses the absolute values of the file sizes, rather than the delta (e.g., difference) values, and results in the selection of 120 as the file size. A similar result occurs for the timestamps (atime, ctime, and mtime). The maximum timestamp values indicate the latest times.

Rule 604 is to sum all the delta values for the number of blocks, from each of the updates, and add the sum to the initial value to produce the final value of the number of blocks. The illustrated example indicates an initial numblocks (number of blocks) value of 50. Writer A writes 10 blocks, so the numblocks delta is +10, and the absolute value of numblocks is 60. Writer B then writes concurrently with Writer C. Writer B writes 20 blocks, so the numblocks delta is +10, and the absolute value of numblocks is 70, determined by adding 10 to the absolute value of 60 (from Writer A). Writer C writes 1 block, so the numblocks delta is +1, and the absolute value of numblocks is 61, determined by adding 1 to the absolute value of 60 (from Writer A). Rule 604 uses the delta values, adding 50 to 10, plus 10, plus 1, to calculate 71. This is the final value for the number of blocks.

Rule 606 results in atomicity for the upgrade lock, even while permitting concurrent R/W operations. Rule 608, which is a part of rule 606, permits a new upgrade lock if there is no prior upgrade lock. The new upgrade lock can exist with multiple shared locks, which permits the concurrent R/W operations. Rule 610, which is also a part of rule 606, denies a new upgrade lock if there is currently a prior-existing upgrade lock still in force, thereby enforcing the atomic operations. An upgrade lock can co-exist with shared locks. Rule 612, which is also a part of rule 606, denies a new upgrade lock if there is currently a prior-existing exclusive lock still in force. An upgrade lock cannot exist with an exclusive lock. Exclusive lock is used for operations that cannot happen concurrently with other operations. For example, deleting a file requires the exclusive lock on it.

Figure 7:
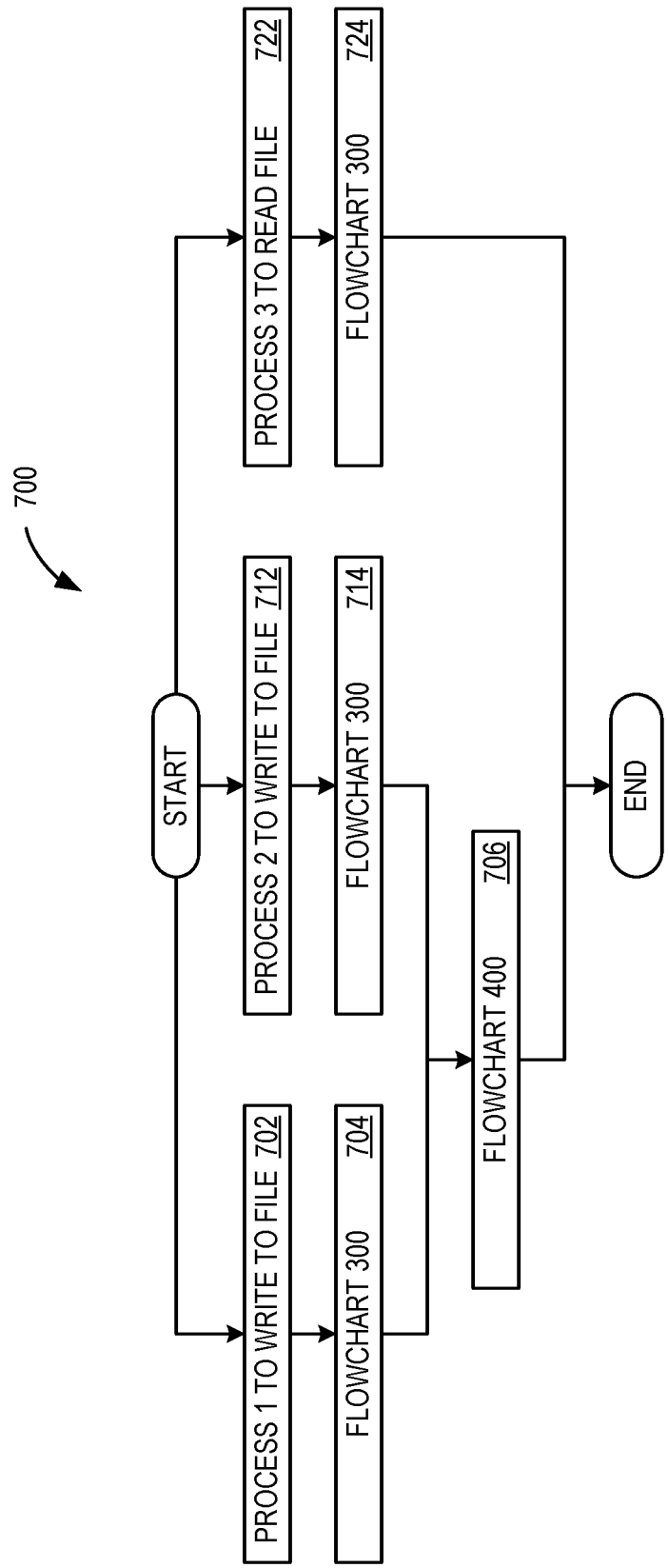
FIG. 7 illustrates a flowchart showing a method for isolating concurrent read and write transactions on a file, according to an example implementation incorporating aspects of FIGS. 3-6.

FIG. 7 illustrates a flowchart 700 showing a method for isolating concurrent read and write transactions on a file. Flowchart 700 incorporates aspects of FIGS. 3-6 and some examples are performed by computing device 802 of FIG. 8. Process 1 is set to write to a file in operation 702, process 2 is also set to write to the same file (concurrently with process 1) in operation 712, and process 3 is set to concurrently read from the same file in operation 722. Process 1 initializes operations according to flowchart 300, in operation 704, while process 2 initializes a parallel set of operations according to flowchart 300, in operation 714. Concurrently, process 3 initializes yet another parallel set of operations according to flowchart 300, in operation 724. When operations 704 and 714 complete (each a manifestation of the operations of flowchart 300), operation 706 initiates the operations of flowchart 400. Because processes 1 and 2 were write operations, when process 3 completes the operations of flowchart 300, the original RCU stat pointer is deleted (see operation 318 of FIG. 3 and also FIG. 5B).

Figure 8:
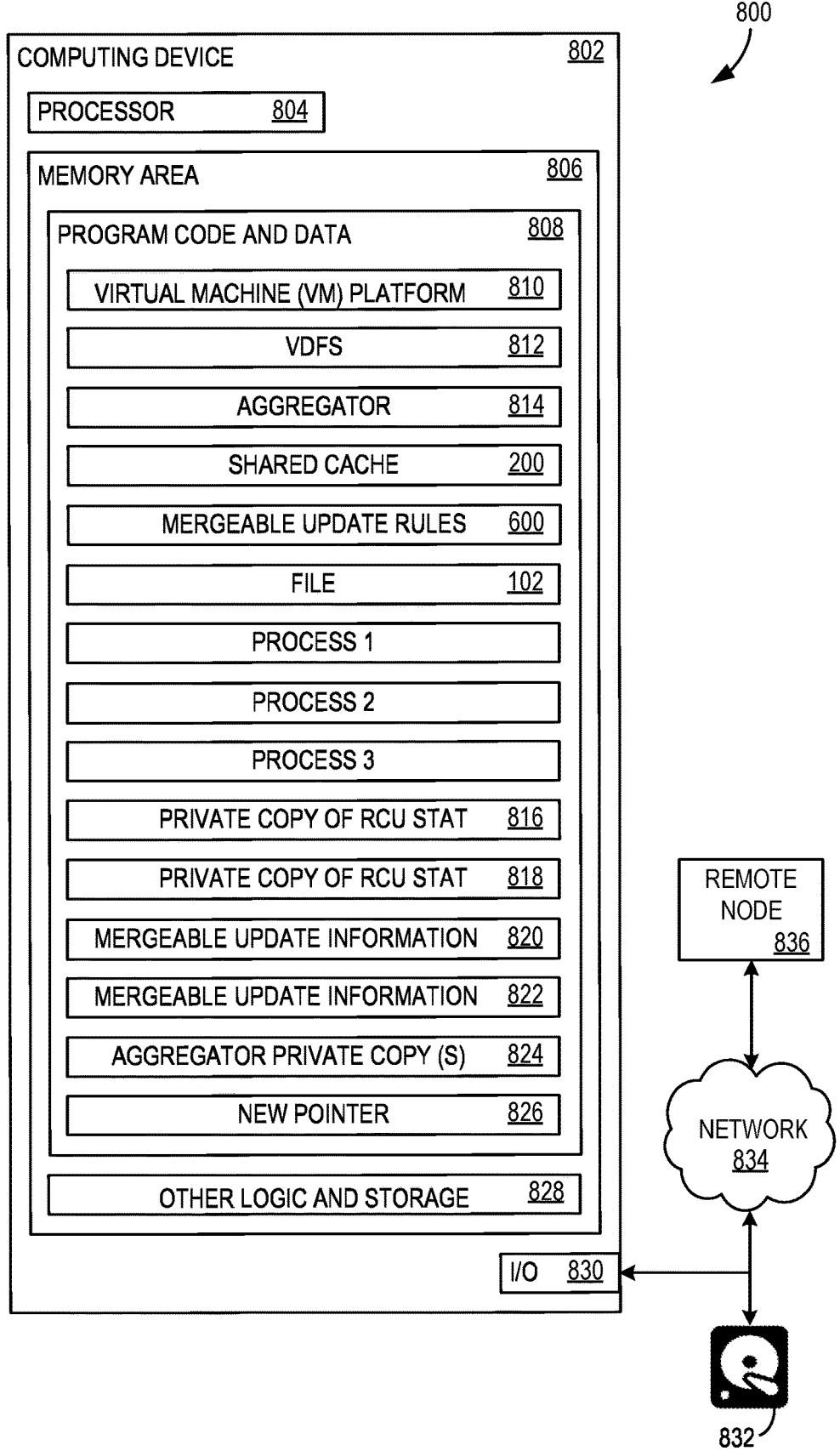
FIG. 8 illustrates a block diagram of an example computing architecture that implements aspects disclosed herein including, for example, the flowchart of FIG. 7.

FIG. 8 illustrates a block diagram of an example computing architecture 800, including an example computing device 802 (a computer system), that implements aspects disclosed herein. Example computing architecture 800, for example, implements the operations of flowchart 700 of FIG. 7. Computing device 802 has at least a processor 804 and a memory area 806 that holds program code and data 808. Memory area 806 is any device allowing information, such as computer executable instructions and/or other data, to be stored and retrieved. For example, memory area 806 may include one or more random access memory (RAM) modules, persist memory, phase change memory, flash memory modules, hard disks, shingled disks, solid-state disks, and/or optical disks. Program code 808 comprises computer executable instructions and associated data, including a virtual machine (VM) platform 810, and a VDFS 812.

An aggregator 814 performs the operations of flowchart 400 of FIG. 4, with shared cache 200 (of FIG. 2) and file 102 (of FIG. 1), using mergeable update rule set 600 (of FIG. 6). Process 1, process 2, and process 3 represent any of the R/W processes (I/O processes) described herein, such as the processes of FIGS. 1, 5A, and 5B. Private copy of RCU stat 816 and private copy of RCU stat 818 represent private copies of RCU stat 214 that were created by various processes during operation 306 flowchart 300 (of FIG. 3). Mergeable update information 820 and mergeable update information 822 represent the mergeable updates for various transaction that were written during operation 310 of flowchart 300 (of FIG. 3) and merged together in operation 408 of flowchart 400 (of FIG. 4).

Aggregator private copy 824 is the copy of the portion of the file stat (e.g., RCU stat) that was placed into private storage during operation 404 and then copied into file stat data for the file during operation 412 (both of FIG. 4). New pointer 826 is the pointer whose creation was depicted in FIG. 5B, and which corresponds with reference count 210b.

Other logic and storage 828 includes any other applications, data, and storage used during the operations of computing device 802. An input/output (I/O) module 830 permits storage of program code and data 808 in a storage location 832, and accepting inputs form users. I/O module 830 also permits communication over network 834 with a remote node 836, which may be another manifestation of computing device 802. Computing device 802 represent any device executing instructions (e.g., as application programs, operating system functionality, or both) to implement the operations and functionality described herein. Computing device 802 may include any portable or non-portable device including a mobile telephone, laptop, tablet, computing pad, netbook, gaming device, portable media player, desktop personal computer, kiosk, and/or tabletop device. Additionally, computing device 802 may represent a group of processing units or other computing devices, such as in a cloud computing system or service. Processor 804 may include any quantity of processing units and may be programmed to execute any components of program code 808 comprising computer executable instructions for implementing aspects of the disclosure. In some embodiments, processor 804 is programmed to execute instructions such as those illustrated in the figures.

ADDITIONAL EXAMPLES

An example system for isolating concurrent read and write transactions on a file comprises: a processor; a computer-readable medium storing instructions that are operative when executed by the processor to: obtain an upgrade lock of file stat data for the file; copy at least a portion of the file stat into a private storage; for each mergeable transaction in a transaction group, merge an update of the current mergeable transaction into the file stat portion in the private storage; atomically store the file stat portion of the private storage into the file stat data for the file; and release the upgrade lock of the file stat data for the file.

An example method of isolating concurrent read and write transactions on a file comprises: obtaining an upgrade lock of file stat data for the file; copying at least a portion of the file stat into a private storage; for each mergeable transaction in a transaction group, merging an update of the current mergeable transaction into the file stat portion in the private storage; atomically storing the file stat portion of the private storage into the file stat data for the file; and releasing the upgrade lock of the file stat data for the file.

One or more exemplary non-transitory computer storage medium having computer-executable instructions that, upon execution by a processor, cause the processor to at least perform operations that comprise: obtaining an upgrade lock of file stat data for the file; copying at least a portion of the file stat into a private storage; for each mergeable transaction in a transaction group, merging an update of the current mergeable transaction into the file stat portion in the private storage; atomically storing the file stat portion of the private storage into the file stat data for the file; and releasing the upgrade lock of the file stat data for the file.

Alternatively, or in addition to the other examples described herein, examples include any combination of the following:

copying data including timestamp, file size, and a number of blocks for the file into the private storage;

selecting the maximum timestamp value for at least one timestamp selected from the list consisting of: atime, ctime, and mtime;

selecting a maximum file size value as a final file size value for the file;

adding a delta of a number of blocks to an initial number of blocks to determine a final number of blocks;

atomicity of storing the file stat portion of the private storage into the file stat data for the file is provided by the upgrade lock;

atomically storing the file stat portion of the private storage into the file stat data for the file comprises creating a new pointer for the file stat portion;

while a first writing process is writing to the file in a first transaction, obtaining, by a second writing process, a shared lock of the file stat data; obtaining, by the second writing process, a shared pointer of at least a portion of the file stat; writing, by the second writing process, to the file in a second transaction; storing a mergeable update for the second transaction; releasing, by the second writing process, the shared pointer of the at least a portion of the file stat; committing the second transaction; and releasing, by the second writing process, the shared lock of the file stat data; and while the second writing process is writing to the file, reading from the file with a reading process.

Exemplary Operating Environment

The operations described herein may be performed by a computer or computing device. The computing devices comprise processors and computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, NVMe drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein.

While some virtualized embodiments are described with reference to VMs for clarity of description, the disclosure is operable with other forms of virtual computing instances (VCIs). A VCI may be a VM, a container, and/or any other type of virtualized computing instance.

In examples that involve a hardware abstraction layer on top of a host computer (e.g., server), the hardware abstraction layer allows multiple containers to share the hardware resource. These containers, isolated from each other, have at least a user application running therein. The hardware abstraction layer thus provides benefits of resource isolation and allocation among the containers. In some examples, VMs may be used alternatively or in addition to the containers, and hypervisors may be used for the hardware abstraction layer. In these examples, each VM generally includes a guest operating system in which at least one application runs.

For the container examples, it should be noted that the disclosure applies to any form of container, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of isolating concurrent read and write transactions on a file by a plurality of processes, the method comprising:
   providing, by a processor, a shared lock of file stat data for the file to the plurality of processes, the file stat data representing metadata for the file, the file stat data and the file being stored in a first storage area, wherein each of the plurality of processes is configured to concurrently copy at least a portion of the file stat data from the first storage area into a respective second storage area associated with the process, complete a transactions associated with the file, and store an update of the file stat data for the completed transaction to the respective second storage area associated with the process;
   after each of the plurality of processes has stored the update of the file stat data for the completed transaction to the respective second storage area associated with the process:
      providing, by the processor, an upgrade lock of the file stat data;
      obtaining each stored update of the file stat data for each of the plurality of processes from the respective second storage area;
      merging each obtained stored update of the file stat data from the respective second storage area with the file stat data from the first storage area; and
      atomically storing the merged file stat data in the file stat data in the first storage area.

2. The method of claim 1, wherein each respective second storage area is a private storage.

3. The method of claim 1, wherein merging each obtained stored updates with the file stat data from the first storage area comprises:
   selecting a maximum timestamp value for at least one timestamp selected from a list consisting of:
      access time (atime), change time (ctime), and modification time (mtime).

4. The method of claim 1, wherein copying at least a portion of the file stat data comprises copying at least a portion of a latest version of the file stat data from the first storage area.

5. The method of claim 1, wherein each second storage areas corresponds to a respective one of the plurality of processes.

6. The method of claim 1, the method further comprising:
   obtaining, by a reading process, a first stat pointer to access the file and setting a value of a first reference counter at one corresponding to the first stat pointer;
   while the merging is being executed, maintaining the value of the first reference counter at one and creating a second stat pointer and a second reference counter with count value set at one; and
   upon the reading process releasing the first stat pointer, decrementing the first reference counter to zero, deleting the first stat pointer and maintaining the second reference counter at one, wherein the second reference counter points to the merged file stat data.

7. The method of claim 1, wherein atomically storing the merged file stat data in the file stat data in the first storage area comprises:
   creating a new pointer for the file stat data.

8. The method of claim 1, further comprising:
   while a first writing process is writing to the file in a first transaction,
   obtaining, by a second writing process, the shared lock of the file stat data;
   obtaining, by the second writing process, a shared pointer of at least a portion of the file stat data;
   writing, by the second writing process, to the file in a second transaction;
   storing an update of the file stat data for the second transaction in a second storage area associated with the second writing process;
   releasing, by the second writing process, the shared pointer of the at least a portion of the file stat data;
   committing the second transaction; and
   releasing, by the second writing process, the shared lock of the file stat data.

9. The method of claim 8, further comprising:
   while the second writing process is writing to the file, reading from the file by a reading process.

10. A computer system for isolating concurrent read and write transactions on a file by a plurality of processes, the computer system comprising:
    a processor;
    a computer-readable medium storing instructions that are operative when executed by the processor to:
       provide a shared lock of file stat data for the file to the plurality of processes, the file stat data representing metadata for the file, the file stat data and the file being stored in a first storage area, wherein each of the plurality of processes is configured to concurrently copy at least a portion of the file stat data from the first storage area into a respective second storage area associated with the process, complete a transaction associated with the file, and store an update of the file stat data for the completed transaction to the respective second storage area associated with the process;

after each of the plurality of processes has stored the update of the file stat data for the completed transaction to the respective second storage area associated with the process:

provide an upgrade lock of the file stat data;

obtain each stored update of the file stat data for each of the plurality of processes from the respective second storage area;

merge each obtained stored update of the file stat data from the respective second storage area with the file stat data from the first storage area; and atomically store the merged file stat data in the file stat data in the first storage area.

11. The computer system of claim 10, wherein copying at least a portion of the file stat data into the respective second storage area comprises:

copying at least a portion of the file stat data directly from the first storage area into a second storage area.

12. The computer system of claim 10, wherein merging each obtained stored update with the file stat data from the first storage area comprises:

selecting a maximum timestamp value for at least one timestamp selected from a list consisting of:

access time (atime), change time (ctime), and modification time (mtime);

selecting a maximum file size value as a final file size value for the file; and adding a delta of a number of blocks to an initial number of blocks to determine a final number of blocks.

13. The computer system of claim 10, wherein the instructions are further operative to:

obtain a first stat pointer to access the file and setting a value of a first reference counter at one corresponding to the first stat pointer;

while the merging is being executed, maintain the value of the first reference counter at one and create a second stat pointer and a second reference counter with count value set at one; and;

upon a reading process releasing the first stat pointer, decrement the first reference counter to zero, delete the first stat pointer and maintain the second reference counter at one, wherein the second reference counter points to the merged file stat data.

14. The computer system of claim 10, wherein atomically storing the merged file stat data in the file stat data in the first storage area comprises:

creating a new pointer for the file stat data.

15. The computer system of claim 10, wherein the instructions are further operative to:

while a first writing process is writing to the file in a first transaction, obtain, by a second writing process, the shared lock of the file stat data;

obtain, by the second writing process, a shared pointer of at least a portion of the file stat data;

write, by the second writing process, to the file in a second transaction;

store an update of the file stat data for the second transaction in a second storage area associated with the second writing process;

release, by the second writing process, the shared pointer of the at least a portion of the file stat data;

commit the second transaction; and release, by the second writing process, the shared lock of the file stat data.

16. A non-transitory computer storage medium having computer-executable instructions that, upon execution by a processor, cause the processor to at least perform operations to isolate concurrent read and write transactions on a file by a plurality of processes, the operations comprising:

providing, by a processor, a shared lock of file stat data for the file to the plurality of processes, the file stat data representing metadata for the file, the file stat data and the file being stored in a first storage area, wherein each of the plurality of processes is configured to concurrently copy at least a portion of the file stat data from the first storage area into a respective second storage area associated with the process, complete a transaction associated with the file, and store an update of the file stat data for the completed transaction to the respective second storage area associated with the process;

after each of the plurality of processes has stored the update of the file stat data for the completed transaction to the respective second storage area associated with the process:

providing, by the processor, an upgrade lock of the file stat data;

obtaining each stored update of the file stat data from the respective second storage area;

merging each obtained stored update of the file stat data from the respective second storage area with the file stat data from the first storage area; and atomically storing the merged file stat data in the file stat data in the first storage area.

17. The non-transitory computer storage medium of claim 16, wherein copying at least a portion of the file stat data into the respective second storage area comprises:

copying data including timestamp, file size, and a number of blocks for the file into the respective second storage area.

18. The non-transitory computer storage medium of claim 16, wherein merging each obtained stored update with the file stat data from the first storage area comprises:

selecting a maximum timestamp value for at least one timestamp selected from a list consisting of:

access time (atime), change time (ctime), and modification time (mtime);

selecting a maximum file size value as a final file size value for the file; and adding a delta of a number of blocks to an initial number of blocks to determine a final number of blocks.

19. The non-transitory computer storage medium of claim 16, wherein atomically storing the merged file stat data in the file stat data in the first storage area comprises:

creating a new pointer for the file stat data.

20. The non-transitory computer storage medium of claim 16, wherein the computer-executable instructions further cause the processor to perform operations comprising:

while a first writing process is writing to the file in a first transaction, obtaining, by a second writing process, the shared lock of the file stat data;

obtaining, by the second writing process, a shared pointer of at least a portion of the file stat data;

writing, by the second writing process, to the file in a second transaction;

storing an update of the file stat data for the second transaction in a second storage area associated with the second writing process;

releasing, by the second writing process, the shared pointer of the at least a portion of the file stat data;

committing the second transaction; and releasing, by the second writing process, the shared lock of the file stat data.

\* \* \* \* \*